April 4, 1950 H. S. BEATTIE 2,502,917

RECORD CONTROLLED ACCUMULATING MECHANISM

Filed Oct. 16, 1946 3 Sheets-Sheet 1

INVENTOR
HORACE S. BEATTIE
BY William Lang
ATTORNEY

April 4, 1950 H. S. BEATTIE 2,502,917

RECORD CONTROLLED ACCUMULATING MECHANISM

Filed Oct. 16, 1946 3 Sheets-Sheet 2

INVENTOR
HORACE S. BEATTIE
BY William Lang
ATTORNEY

RECORD CONTROLLED ACCUMULATING MECHANISM

Filed Oct. 16, 1946

INVENTOR
HORACE S. BEATTIE
BY William Lang
ATTORNEY

Patented Apr. 4, 1950

2,502,917

UNITED STATES PATENT OFFICE 2,502,917

RECORD CONTROLLED ACCUMULATING MECHANISM

Horace S. Beattie, Poughkeepsie, N. Y., assignor to International Business Machines Corporation, New York, N. Y., a corporation of New York Application October 16, 1946, Serial No. 703,614

8 Claims. (Cl. 235—61.6)

This invention relates to record controlled accounting machines and more particularly to the accumulating or totalizing mechanisms thereof.

The principal object of the invention is to provide a practical form of entering mechanism for an accumulator operable under timed electrical impulses initiated by perforations in a record card and according to the decimal system of notation, wherein the portion of a cycle required to enter an amount into the accumulator is considerably shortened.

The prior art as exemplified in present commercial machines employs a differential accumulator, each denominational order of which comprises an adding wheel advanceable through ten rotative positions to represent the digits 0, 1 . . . 9 and thus requires a so-called cycle of operation for each entry of a length or duration sufficient to permit a 9 step advance for the highest possible digit 9.

In accordance with the present invention, it is proposed to provide a system of digit recording in which the digits are represented as combinations of four values which, taken singly or in combination, produce all the decimal values 1 to 9. In such system one of the values selected is 5 and the others are 2, 1 and 2. In representing the digits on the card they are made up of component values as follows:

| Digit | Component Values | | | |
|---|---|---|---|---|
| | 2 | 1 | 5 | 2 |
| 1 | | X | | |
| 2 | X | | | |
| 3 | | X | | X |
| 4 | X | | | X |
| 5 | | | X | |
| 6 | | X | X | |
| 7 | | | X | X |
| 8 | | X | X | X |
| 9 | X | | X | X |

The accumulator, as constructed for the purpose of the present invention, comprises for each denominational order thereof a pair of adding wheels, one of which has two sets of five rotative positions 0, 1, 2, 3 and 4 and the other has five sets of two rotative positions 0 and 5. The 2, 1 and 2 value positions on the card control the advance of the first wheel to position it solely according to these values, so that for any combination representable thereby the maximum entering advance is no more than four steps. The 5 value position on the card controls the advance of the second wheel a single step, so that if the wheels are controlled successively a maximum of five steps suffices to enter a 9 in the accumulator order.

Following the entering operation or period in the cycle, a so-called carry-over operation or step occurs during which the 0, 5 wheel is advanced one step if its companion 0 to 4 wheel has advanced from its 4 to its 0 position, and the 0 to 4 wheel in the next higher order is advanced one step if the 0, 5 wheel in the lower order had advanced from or is about to advance from its 5 to its 0 position.

The accumulator as thus provided in accordance with this invention provides for adding a selected component (as 5) by single step advance and for separately adding remainders 1 to 4 differentially in accordance with these values and then effecting an appropriate carry-over step of advance in either or both parts of the accumulator order.

The accumulator preferably employed in connection with the present invention is of a type well known in the art wherein the initiation of a digit entering operation is effected by transmission of a start impulse to a start or advance electromagnet which couples the accumulator wheel or element to a driving shaft, and wherein the entry operation may be terminated by transmitting an impulse to a stop electromagnet which has the designated function. For additive operations, the start magnets for the 0 to 4 and the 0, 5 wheels receive impulses under control of the card perforation sensing means at predetermined times in the entering portion of a cycle of operation. The impulse transmitting means associated with the stop magnets is effective after transmission of each start impulse to transmit an impulse to the stop magnet to terminate the entering operation, if it was initiated. By suitably spacing the timing of successive start and stop impulses for the two types of adding wheels, entering periods of various denominations are provided which effect the entry of the desired values in the pair of wheels.

A still further object of the invention is to enable the entering mechanism to operate in a subtractive manner to enter the 9's complements of each digit in the pairs of adding wheels.

Other objects of the invention will be pointed out in the following description and claims and illustrated in the accompanying drawings, which disclose, by way of example, the principle of the invention and the best mode, which has been contemplated, of applying that principle.

Figure 5A:
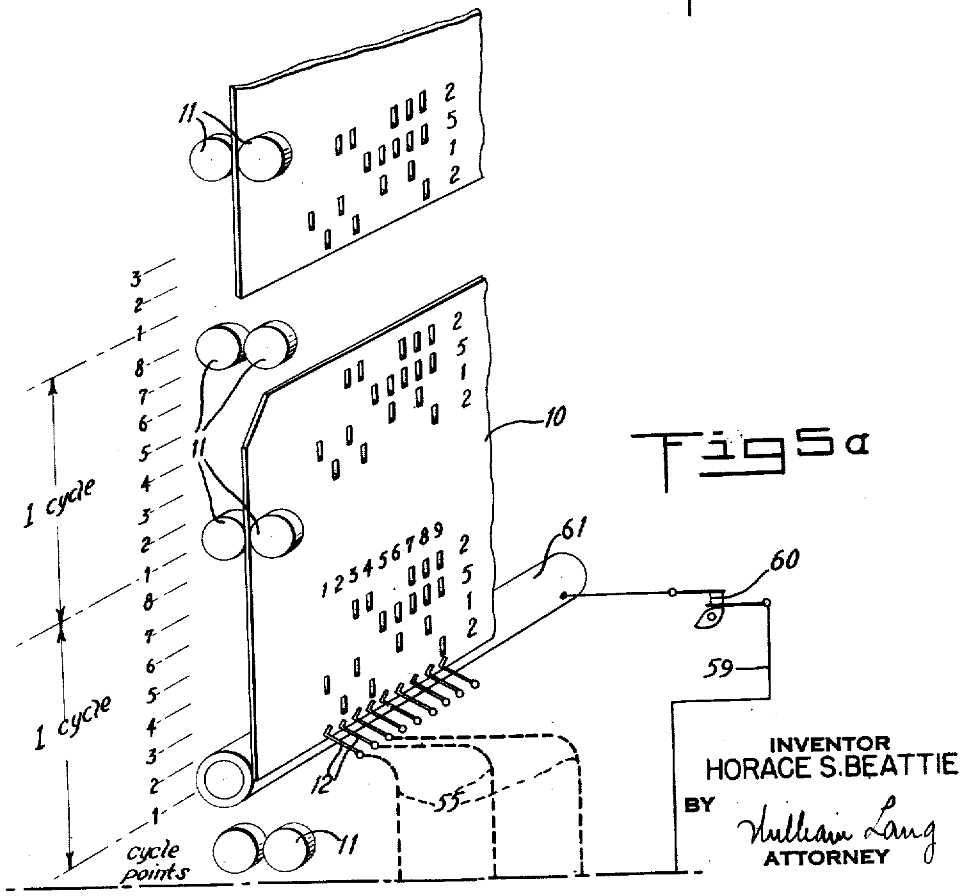
Figure 5B:
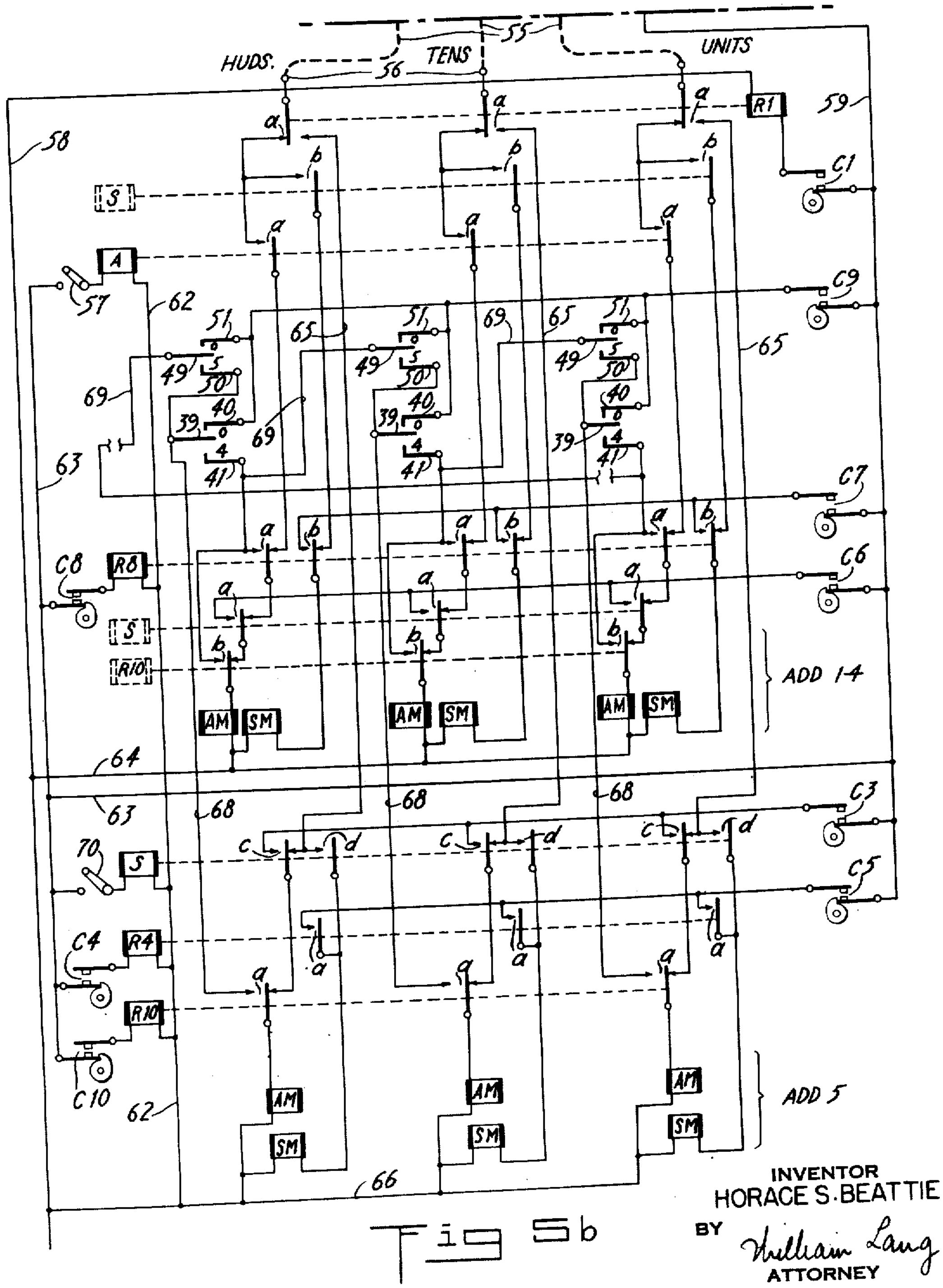

Figs. 5*a* and 5*b* constitute a wiring diagram of the circuits for controlling the operation of the accumulating mechanism.

*The card*

In Fig. 5*a* is shown a portion of a record card 10 provided with vertical columns in which the digits 1 to 9 may be recorded by perforations made in sets of four horizontal rows having the assigned values 2, 1, 5, 2 as shown.

Figure 4:
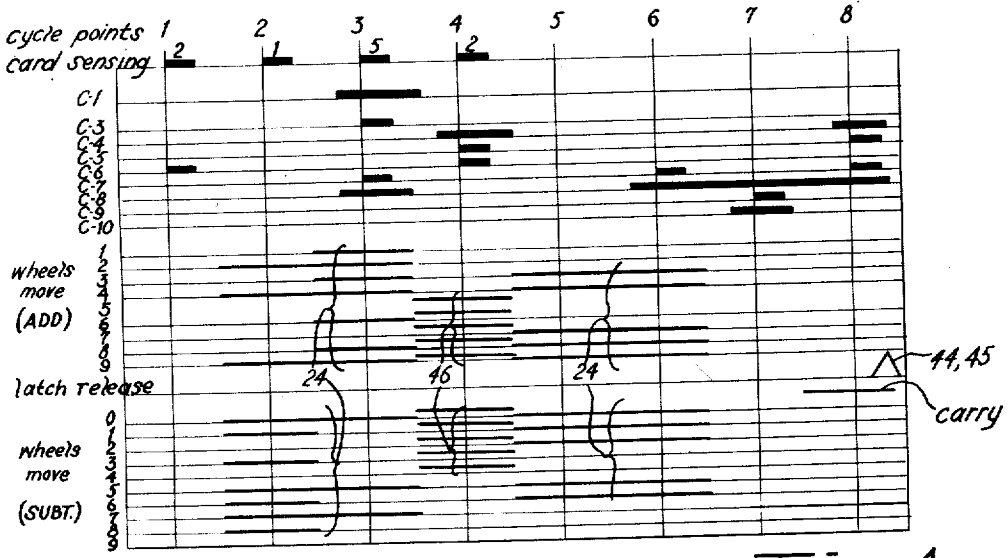
Fig. 4 is a timing diagram.

It is diagrammatically indicated that the card 10 is advanced by feed rollers 11 to pass a row of sensing brushes 12 and, after the perforations in the lower portion of card 10 have passed the brushes 12, there is an interval followed by the passing of the perforations in the upper portion of the card. The interval between the lowest perforating rows in the two sets of perforations is termed a cycle of operation of the machine, and this cycle is subdivided into eight so-called cycle points. In Fig. 4 the period in a cycle during which brushes 12 sense the 2, 1, 5, 2 value positions is shown in relation to the timing of closure of a number of cam operated contacts C1 and C3 to C10 which are driven from a suitable shaft (not shown) in time with the card feed rollers to effect closure of the contacts at the times indicated.

*The accumulator*

Figures 1, 2, 3:
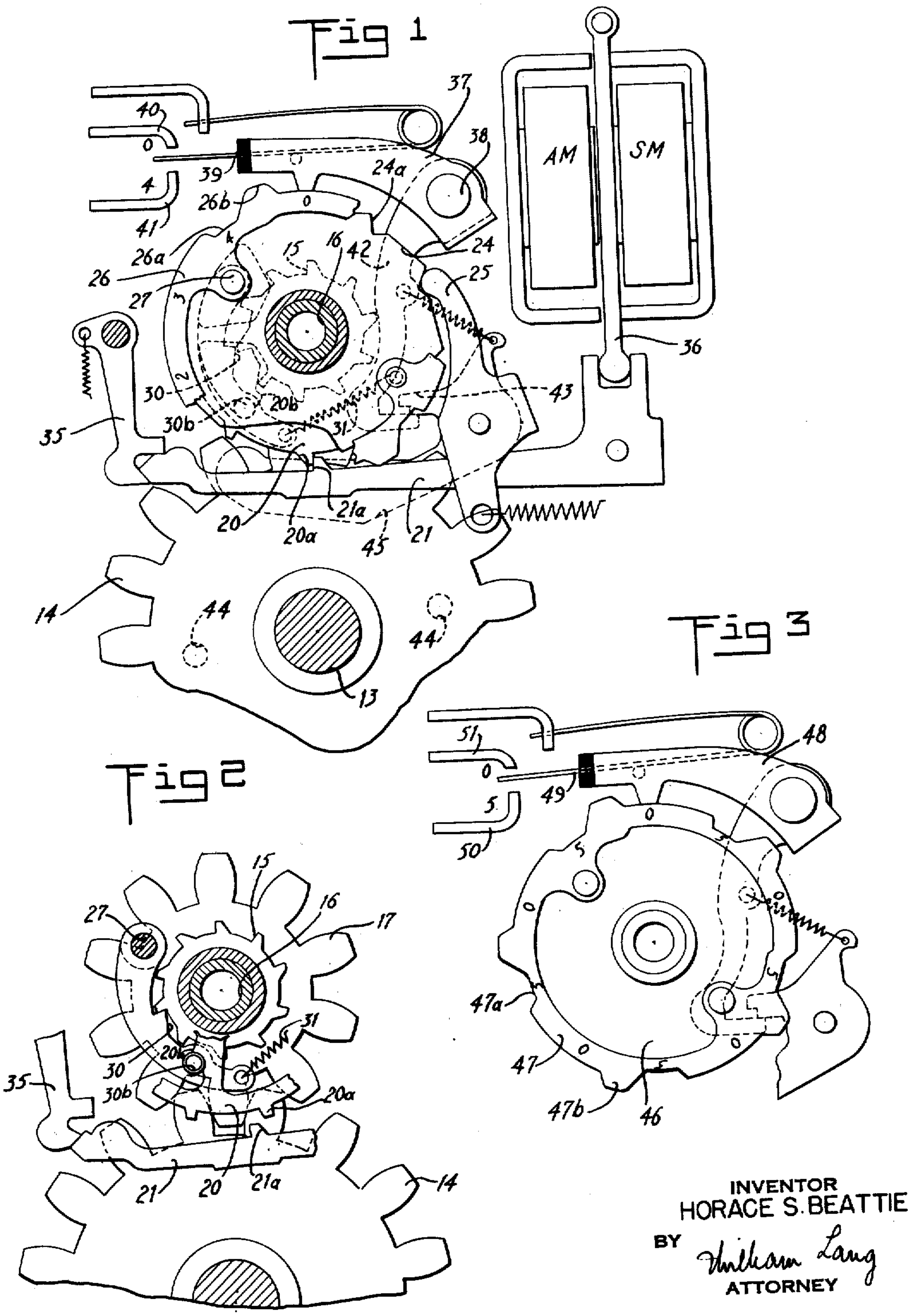
Fig. 1 is a view in side elevation of the essential operating elements of the part of an accumulator order in which the remainder values 1 to 4 are entered.
Fig. 2 is a detail view showing the driving clutch mechanism.
Fig. 3 is a detail of the adding wheel on which the components 5 are entered.

In Fig. 1 drive shaft 13 is suitably geared to the card feed rollers, so as to make one-half revolution for each cycle of operation. For each denominational order of the accumulator, this shaft 13 has two gears 14 secured thereto which drive identical clutch mechanism, one for the 2's adding wheel and one for the 0 to 4 remainder or 5's adding wheel.

This clutch driving mechanism is of the same construction as shown in Lake et al. Patent 2,328,653 and includes a ratchet 15 which is free on post 16 and integral with a gear 17 driven by gear 14 (Fig. 2). Rotatably carried by post 16 is a disk 20 having ten teeth **20*a* adapted to be engaged by a tooth 21*a* on the long arm of a clutch lever 21 to hold the disk against rotation in a counterclockwise direction. At the side of disk 20 is a register or adding wheel 24 rotatable on post 16 and provided with ten peripheral notches 24*a*. Wheel 24 may take any of ten rotative positions with values 0, 1, 2, 3 and 4, there being two positions for each of these values. A spring pressed lever 25 engages with a notch 24*a* of wheel 24 to hold the wheel impositively and to center it in the value position to which it has been rotated. A transfer cam 26 is fixed to the side of wheel 24 and a stud 27 in wheel 24 extends through an opening in disk 20 to pivotally carry a clutch dog 30. A spring 31 urges the tooth of dog 30 to engage ratchet 15. In the positions shown in Fig. 1, the clutch lever 21 is in declutching position, its tooth 21*a* is restraining rotation of disk 20 counterclockwise and dog 30 is clear of ratchet 15. The dog 30 is being held clear of the ratchet by coaction of a pin 30*b* on the dog with a cam edge 20*b* of disk 20**.

When the clutch lever 21 is dropped to cause its tooth **21*a* to release the disk 20 for counterclockwise movement, the spring 31 is effective to rock the dog 30 into engagement with ratchet 15. During this movement of the dog 30, its pin 30*b* rides down the cam edge 20*b* and cams the disk counterclockwise until its tooth 20*a*, previously engaged by tooth 21*a*, is to the right of the latter tooth. The parts are then in the clutching position shown in Fig. 2 and the register wheel 24 is coupled to the drive device 15, 17 for rotation. Through engagement of the pin 30*b* of the dog 30 with cam edge 20*b*, the disk 20** is forced to rotate counterclockwise together with the register wheel.

When the clutch lever 21 is returned to upper declutching position, its tooth **21*a* intercepts a tooth 20*a* of disk 20 and stops the disk. The register wheel 24 and dog 30 continue rotating while cam edge 20*b* of disk 20 cams the pin 30*b* upwardly until it is again in its outer position. As the pin 30*b* is cammed outwardly, clutch dog 30 moves clear of ratchet 15 and declutches the register wheel from the driving means. The register wheel is then held and centered in its new value position by lever 25. A spring urged latch 35 serves to hold lever 21** in either clutching or declutching position.

The clutch lever 21 has a short arm swiveled to the lower end of an armature 36 which is disposed between an advanced magnet AM and a stop magnet SM. Energization of magnet AM rocks armature 36 clockwise to lower lever 21 and energization of magnet SM rocks armature 36 counterclockwise to raise the lever 21.

When wheel 24 is in its 0, 1, 2 or 3 positions, the cam 26 holds a carry lever 37 pivoted at 38 in the position shown in Fig. 1, where a contact blade 39 (insulated from lever 37) takes a mid-position between contact elements 40 and 41. When the wheel is in its 4 position, a tooth on lever 37 is dropped into a cut **26*a* of cam 26 and blade 39 contacts element 41. When the wheel 24 passes from the 4 to 0 position, a rise 26*b* rocks lever 37 to cause blade 39 to engage element 40. When the lever is so rocked, an arm 42 integral therewith is engaged and held by a spring urged latch 43, which maintains the contact engagement between 39 and 40 until a pin 44 in gear 14 strikes an arm 45 integral with the latch 43 to release lever 42**. The point in the cycle at which such unlatching occurs is indicated in the time chart (Fig. 4).

Through the mechanism just described, the remainder or 1 to 4 adding wheel related to an accumulator order is driven. Through an exactly similar mechanism the 5 wheel 46 is also driven with the difference that the latter wheel has a carry cam 47 provided with five cuts **47*a* and five rises 47*b* coacting with a carry lever 48 to maintain blade 49 in a central position, when the wheel is in its 0 position, to permit it to contact element 50 when it is in its 5 position and to cause it to contact element 51 when it passes from a 5 to a 0 position. On this last movement, the blade 49 is latched in the same manner as block 39 and released by a pin 44** at the time referred to.

Thus, for each denominational order of the accumulator there is provided a pair of adding wheel driving mechamisms of like construction, but differing in the configuration of their carry cams 26 and 47, and these mechanisms might be termed 5's adding mechanisms and 2's adding mechanisms, respectively.

*Circuit diagram*

The manner in which digital values are entered will now be explained in connection with the circuit diagram in which plug connections 55 are made between brushes 12 and sockets 56. Assuming that adding operations only are involved, switch 57 (Fig. 5*b*) is closed after current is placed on lines 59 and 59. This will energize magnet A through a circuit from line 58, wire 62, magnet A, switch 57, and wire 63 to line 59. Magnet A closes its *a* contacts.

As the card 10 moves past brushes 12, it closes the usual card lever contacts 60 so that a circuit is completed, (if there is a hole in the lower 2 position), traceable from line 59 (Fig. 5*a*), contacts 60, contact roller 61, 2 hole, brush 12, connection 55, socket 56 (Fig. 5*b*), *a* contacts of a relay magnet R1 (normal), *a* contacts of magnet A (now closed), *a* contacts of magnet R8 (normal), *a* contacts of magnet S (normal), *b* contacts of magnet R10 (normal), magnet AM of the 1 to 4 adding wheel, and wire 64 to line 58. This will start the 1 to 4 wheel 24 turning at the point indicated in Fig. 4 opposite the value 2 (and also for values 4 and 9, if the 2 hole sensed is a component of these values). If the hole sensed were a 1 hole, the energization of magnet AM would occur one cycle point later, as indicated opposite values 1, 3, 6 and 8.

Just before cycle point 3, relay magnet R8 is energized through closure of contacts C8 and shifts its contacts *a* and *b*, so that when contacts C7 close shortly thereafter circuits are completed from line 59, contact C7, all the *b* contacts of magnet R8 (now shifted) to all the SM magnets and wire 64 to line 58. The wheels 24 will thereby be uncoupled after they have made one or two steps of advance depending upon the time of the initial coupling.

Also, just before the 3 point in the cycle, contacts C1 close to energize relay magnet R1 to shift its *a* contacts, so that as the 5 position is next sensed, a hole therein will complete a circuit from line 59 (Fig. 5*a*), contacts 60, roller 61, 5 hole, brush 12, connection 55 (Fig. 5*b*), socket 56, *a* contacts of magnet R1 (shifted), wire 65, *c* contacts of magnet S, *a* contacts of magnet R10, magnet AM of the adding wheel 46, and wire 66 to line 58.

Just before the 4 point in the cycle, magnet R4 is energized by closure of contacts C4 and its *a* contacts close, so that contacts C5 complete a circuit from line 59, contacts C5, *a* contacts of magnet R4 (now shifted), and all the SM magnets and wire 66 to line 58. Thus, the wheel 46 is uncoupled after one step of movement as indicated in Fig. 4, where the 5 hole represents 5, 6, 7, 8 or 9.

At the 4 point in the cycle, if a second 2 hole is presented, there will be a circuit completed from line 59, contacts 60 (Fig. 5*a*), roller 61, 2 hole, brush 12, connection 55 (Fig. 5*b*), socket 56, *a* contacts of magnet R1 (normal), *a* contacts of magnet A (shifted), *a* contacts of magnet R8 (normal), *a* contacts of magnet S (normal), *b* contacts of magnet R10 (normal), magnet AM and wire 64 to line 58. Two points later, when contacts C7 again close, a circuit is completed from line 59, contacts C7, *b* contacts of magnet R8 (now shifted), magnets SM, wire 64 to line 58. In this manner the 1–4 wheel is advanced two steps in response to the sensing of a 2 hole for the digits 3, 4, 7, 8 and 9.

As the several wheels are advanced, they coact with their related carry contacts which will prepare circuit connections to effect carrying as will now be explained.

Assume that in the units order the 1–4 wheel has passed from 4 to 0, closing and latching its contacts 39, 40. Just before the 6 point in the cycle, contacts C8 reclose to reenergize magnet R8 and just before point 7 contacts C10 close to energize magnet R10, so that at point 7 when contacts C9 close a circuit is completed from line 59, contacts C9, contacts 40, 39 (units order), wire 68, *a* contacts of magnet R10 (shifted), magnet AM and wire 66 to line 58. A cycle point later, contacts C5 close to energize the magnet SM, through *a* contacts of magnet R4, which are also closed at this time (see Fig. 4). Thus, a carry of one unit is effected at the time designated in Fig. 4 to enter a 1 into the 0, 5 wheel of an order when the 1 to 4 wheel in the same order has passed from its 4 to its 0 position.

Assume now that in the units order the 0, 5 wheel has passed from 5 to 0 closing and latching its contacts 49, 51. When contacts C9 close at the carry time, a circuit is completed from line 59, contacts C9, contacts 51, 49 (units order), wire 69, *b* contacts of magnet R10 in the tens order (shifted), magnet AM (tens order), and wire 64 to line 58. A point later, contacts C7 close to energize the SM magnets of the 1 to 4 wheels to interrupt the advance of the wheels.

If, when a carry is effected from a lower to higher order, the higher order stands at 4, i. e. the 1 to 4 wheel is at 4, the circuit branches from wire 69, through contacts 41, 39 and wire 68 to the AM magnet of the 0, 5 wheel to also enter a 1 therein; that is, if the tens order (for example) has a 4 standing therein, the 0, 5 wheel advances to 5 and the 1 to 4 wheel advances to 0.

If when a carry is effected from a lower to higher order the higher order stands at 9, i. e. the 1 to 4 wheel is at 4 and the 0, 5 wheel is at 5, there is an additional branch circuit from wire 69, through contacts 41, 39 and then through contacts 50, 49 (of the tens orders, for example), to wire 69 leading to the AM magnet of the 1 to 4 wheel related to the hundreds order.

Just before the end of the cycle, pin 44 (Fig. 1) rocks lever 45 to unlatch the carry contacts to restore all of them from their uppermost positions in readiness for the next amount entry.

*Subtraction*

Provision is made for entering amounts subtractively by the method of adding 9's complements. For diagrammatic purposes, the arrangement is illustrated as manually adjusted by closure of switch 70 and opening of switch 57. The former will cause energization of magnet S (also shown dotted in two places) so that related *a*, *b*, *c* and *d* contacts thereof are shifted.

Accordingly, when contacts C6 (see Fig. 4) close at the time of sensing the first hole position, all the AM magnets of the 1 to 4 wheels will be energized through circuits from line 59, contacts C6, *a* contacts of magnet S (shifted) and *b* contacts of magnet R10 (normal). In columns where there is a first 2 hole, there will be a parallel circuit traceable from line 49 (Fig. 5*a*), contacts 60, roller 61, 2 hole, brush 12, connection 55 (Fig. 5*b*), socket 56, *a* contacts of magnet R1 (normal), *b* contacts of magnet S (shifted), *b* contacts of magnet R8 (normal), magnet SM and wire 64 to line 58. Since at this time the armature 36 is already against the core of the SM magnet, concurrent impulses to the AM and SM magnets of the same order will not result in the clutching of the accumulator wheel. The reason for this is that the force of attraction exerted by the SM magnet on armature 36 will be greater than that exercised by the AM magnet, because of the air gap between armature 36 and the core of the AM magnet. Thus, for columns having a first 2 hole, the wheel 24 does not turn and in the other columns it commences to rotate until contacts C7 close two points later to complete a circuit from line 59, contacts C7, b contacts of magnet R8 (shifted) and magnet SM to line 58. Inspection of Fig. 4 shows that for the digits 0, 5 and 7 the 1 to 4 wheel is thus advanced two steps.

Where there is a 1 hole, the SM magnet is energized through a circuit traceable from line 59, contacts 60, roller 61, 1 hole, brush 12, commutator 55, socket 56, *a* contacts of magnet R1 (normal), *b* contacts of magnet S (shifted), *b* contacts of magnet R8 (normal) to magnets SM to interrupt the wheel 24 after one step of movement. Thus, for digits 1, 3, 6 and 8, there is a one step advance of wheel 24.

At the time the 5 hole position is sensed, contacts C3 close to energize all the AM magnets of the 0, 5 wheels through circuits traceable from line 59, contacts C3, *c* contacts of magnet S (shifted), *a* contacts of magnet R10 (normal), magnets AM and wire 66 to line 58. If a 5 hole is present, there is a parallel circuit traceable from line 59 (Fig. 5*a*), contacts 60, roller 61, 5 hole, brush 12, connection 55 (Fig. 5*b*), socket 56, *a* contacts of magnet R1 (shifted), wire 65, *d* contacts of magnets S (shifted), magnet SM to line 58. Thus, in columns where there is a 5 hole, there are so-called blocking impulses, so that the related wheel is not set in motion. One cycle point later, when contacts C5 close, all SM magnets of the 0, 5 wheels are energized to stop wheels 46 and the orders for which there are no 5 holes will have advanced one step, that is, for columns containing digits 0, 1, 2, 3 and 4. When the second 2 hole position is sensed at cycle point 4, contacts C6 again close to energize all the AM magnets of wheels 24, and where there is a 2 hole a circuit is completed to concurrently energize magnet SM. Where no hole is present, the wheel advances two steps as before. Thus, for digits 0, 1, 2, 5 and 6, there is a two step advance.

In the foregoing manner, the 9's complement of an amount to be subtracted is directly entered in wheels 24 and 46, and at the carry time the wheels are selectively advanced an additional step as explained for addition. For present purposes, it is assumed that the total is always positive, so that for each negative entry a fugitive one is entered into the lowest order. This is done at the carry time through the carry circuit 69 extending from the highest order to the AM magnet in the lowest order to enter a unit therein through the shifted contacts of magnet R10.

In order to read the settings of the wheels, they may have numerals marked around their peripheries as shown in Figs. 1 and 3.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable machine of the class described, means for sensing a record card having a column of less than nine index point positions representing predetermined digit values, of which one of said values is 5, the digits 1 to 9 being represented by single or combinational designations in said positions with the 5 position representing the digit 5 and included in combinations representing the digits 6 to 9, an accumulator having for each denominational order thereof a 5's adding wheel with rotative positions representing 0, 1, 2, 3, and 4, and a 2's adding wheel with rotative positions representing 0 and 5, driving means for each wheel, means controlled by the sensing means in response to the sensing of a designation in the 5 index point positions for causing the driving means to advance the 2's adding wheel one position, means controlled by the sensing means in response to the sensing of designations in the other index point positions for causing the driving means to advance the 5's adding wheel a number of positions according to the value represented in such positions, carry control devices for each wheel, and means controlled thereby and effective during each cycle, following the entries into the wheels, for causing the 2's wheel of each order to be advanced one position when the related 5's wheel has been advanced five steps, and for causing each 5's wheel to be advanced one position when the next lower ordered 2's wheel has been advanced two steps.

2. In a cyclically operable machine of the class described, accumulating mechanisms constructed and arranged to be controlled by designations on a record combinationally representative of the digits 1 to 9, comprising in combination a pair of rotatable elements for each denominational order of the accumulating mechanism, means responsive to certain designations on the record for rotating one of the elements to any of five rotative positions representative of the digits 0, 1, 2, 3, and 4, means responsive to another designation on the record for rotating the other element to either of two rotative positions representative of the digits 0 and 5, carry-over devices controlled by the first element when it has rotated through more than four positions, for causing rotation of the related other element through one position, and carry over devices controlled by the second element when it has rotated through more than one position for causing rotation of the first named element in the next higher order through one position.

3. In a cyclically operable machine of the class described, an accumulator comprising, for each denominational order thereof a 5's adding wheel and a 2's adding wheel, with carry over devices between related wheels in the same order to effect a unit entry into the 2's wheel when its related 5's wheel has advanced five units and with carry over devices between each 2's wheel and the 5's wheel in the next higher order to effect a unit entry into each higher order 5's wheel when the lower order 2's wheel has advanced two units, means effective during each cycle of the machine for sensing a record card for designations representing an amount, means controlled by the sensing means, for each order of the amount, for rotating the 5's wheel a differential amount when the digit represented is 1 to 4, for rotating the 2's wheel one unit when the digit represented is 5 and for rotating the 2's wheel one unit and the 5's wheel a differential amount when the digit represented is 6 to 9, and means for rendering the carry over devices effective during each cycle following the operation of said sensing means.

4. In a cyclically operable machine of the class described, an accumulator comprising for each denominational order thereof a 5's adding mechanism and a 2's adding mechanism, with carry over devices between related adding mechanism in the same order to effect a unit entry into the 2's adding mechanism when its related 5's adding mechanism has added five units and with carry over devices between each 2's adding mechanism and the 5's adding mechanism in the next higher order to effect a unit entry into each higher order 5's adding mechanism when the lower order 2's adding mechanism has advanced two units, means effective during each cycle of the machine for sensing a record card for designations representing an amount, means controlled by the sensing means, for each order of the amount, for causing the 5's adding mechanism to selectively add when the digit represented is 1 to 4, for causing the 2's adding mechanism to add one unit when the digit represented is 5, and for causing both the 5's and 2's adding mechanisms to operate when the digit represented is 6 to 9, and means for rendering the carry over devices effective during each cycle following the operation of said sensing means.

5. In an accounting machine, means for sensing a column of a record card for designations representing the digits 1 to 9, said column having four designating positions, one representing 5 and the others representing lesser values, with the several digits being represented in positions corresponding to their value or in a combination of positions the sum of whose values equals the digit, a denominationally ordered accumulator, each order including a device for adding tenths and a device for adding halves, carry over mechanism therebetween, means controlled by the sensing means in response to the sensing of said designations for effecting an entry into said halves adding device when the digit represented is 5 or more and for effecting an entry into said tenths adding device when the digit represented is 1 to 4 or 6 to 9, whereby a digit is entered in either or both devices according to its value, and mechanism for entering a carry unit into the tenths device of the next higher order when an entry in the devices of a lower order aggregates 10 or more.

6. In an accounting machine, means for sensing a column of a record card for designations representing the digits 1 to 9, said column having four designating positions, one representing 5 and the others representing lesser values, with the several digits being represented in positions corresponding to their value or in a combination of positions the sum of whose values equals the digit, a denominationally ordered accumulator, each order including a device for adding tenths and a device for adding halves, carry over mechanism therebetween, means controlled by the sensing means in response to the sensing of said designations for effecting an entry into said halves adding device when the digit represented is 5 or more and for effecting an entry into said tenths adding device when the digit represented is 1 to 4 or 6 to 9, whereby a digit is entered in either or both devices according to its value, mechanism for entering a carry unit into the tenths device of the next higher order when an entry in the devices of a lower order aggregates 10 or more, and means effective after entries have been made under control of the sensing means to render both carry mechanisms concurrently effective.

7. A decimal accumulator, each denominational order of which comprises a tenths adding mechanism, a halves adding mechanism and carry mechanism therebetween, for adding a unit to the halves mechanism when the tenths mechanism has added 5, a tens carry mechanism between the halves adding mechanism of each order and the tenths adding mechanism of the next higher order to carry a unit when the halves mechanism has added 2, and entering means for entering decimal amounts into said accumulator in the form of halves and tenths in each order.

8. A machine for handling records bearing designations of multiple component values and remainders component values derived from a notation of digital values by dividing the digital values by a common factor, comprising means to sense the designations of multiples and remainders component values, a decimal accumulator, each denominational order of which comprises a multiples adding mechanism and a remainder adding mechanism, means controlled by the sensing means for transmitting entries to the multiples adding mechanism according to the designated multiples component values and for transmitting entries to the remainder adding mechanism according to the designated remainders component values, a first set of carry over devices between the adding mechanism in each order, a second set of carry over devices between the multiple adding mechanism of each order and the remainder adding mechanism of the next higher order, and means effective after each amount entry into the accumulator for rendering said carry over devices effective.

HORACE S. BEATTIE.

REFERENCES CITED

The following references are of record in the file of this patent:

UNITED STATES PATENTS

| Number | Name | Date |
|---|---|---|
| 2,066,764 | Campbell | Jan. 5, 1937 |
| 2,344,885 | Kozma et al. | Mar. 21, 1944 |
| 2,375,332 | Torkelson | May 8, 1945 |
| 2,377,762 | Daly | June 5, 1945 |